W. G. COX.
BUMPER ATTACHMENT FOR VEHICLE SUSPENSION SPRINGS.
APPLICATION FILED NOV. 19, 1921.
1,419,228. Patented June 13, 1922.
2 SHEETS—SHEET 1.
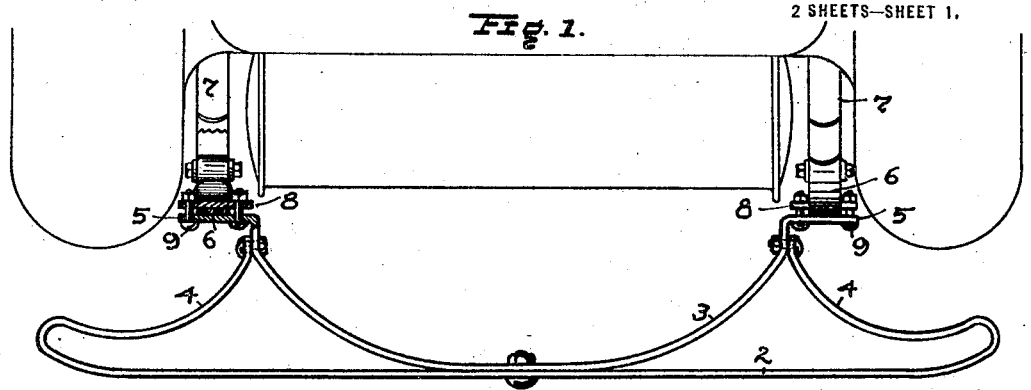
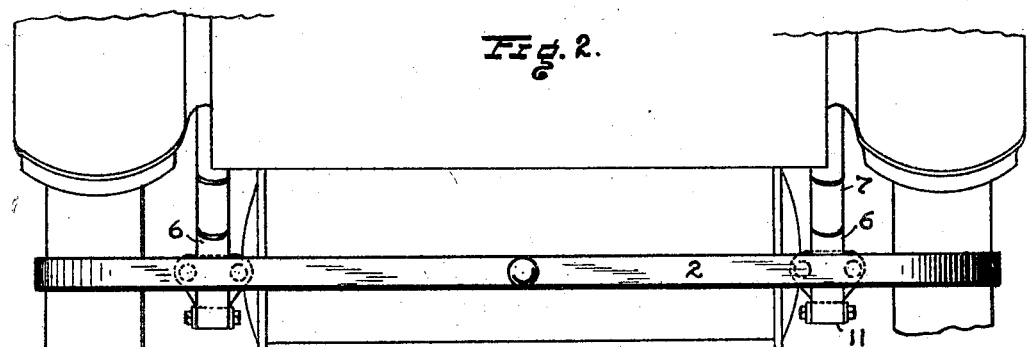
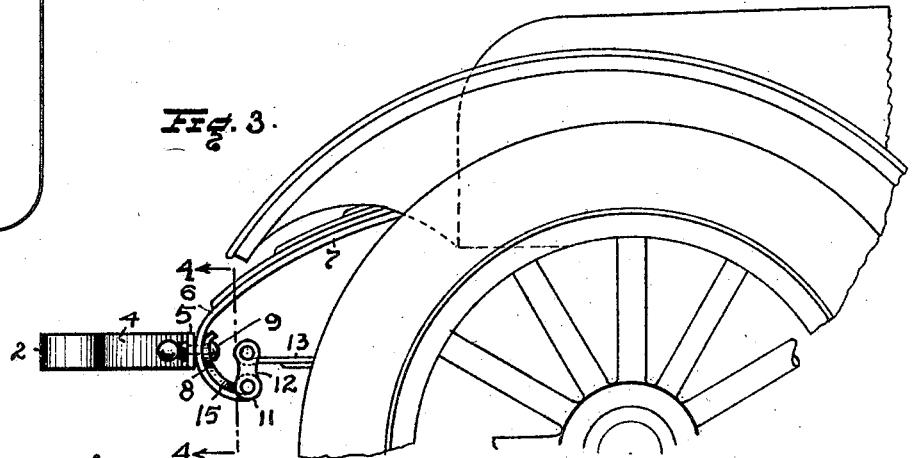
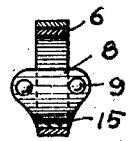
Inventor
W. G. COX

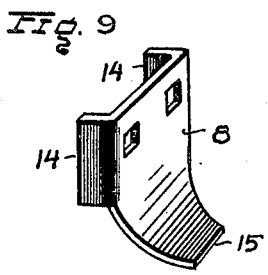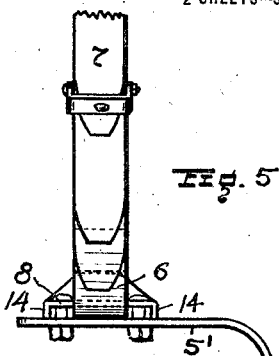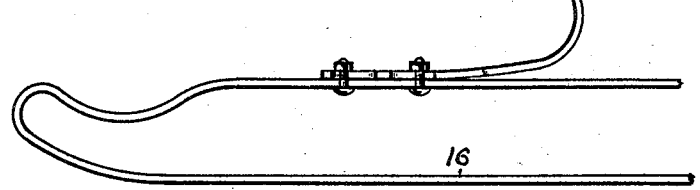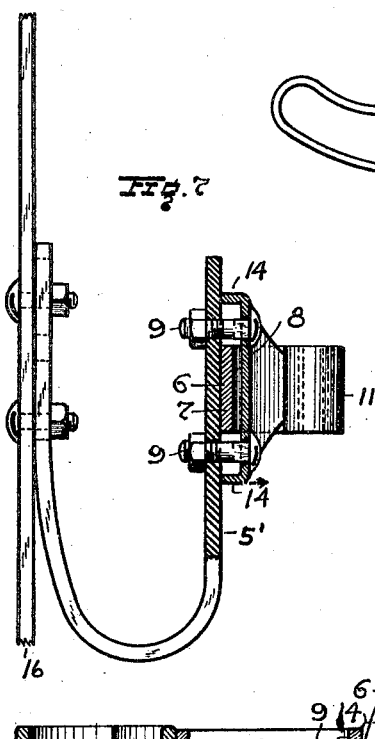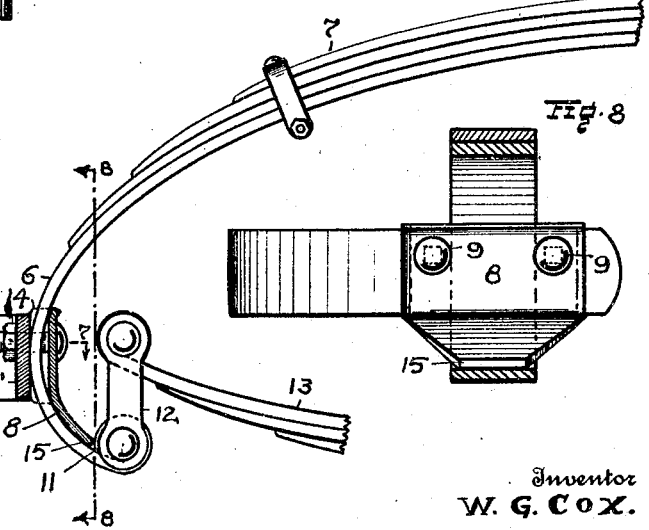

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

BUMPER ATTACHMENT FOR VEHICLE SUSPENSION SPRINGS.

1,419,228. Specification of Letters Patent. Patented June 13, 1922.

Application filed November 19, 1921. Serial No. 516,319.

*To all whom it may concern:*

Be it known that I, WILLIAM G. COX, a citizen of the United States, residing at Cleveland, in the county of Cuyahoga and State of Ohio, have invented certain new and useful Improvements in Bumper Attachments for Vehicle Suspension Springs, of which the following is a specification.

Briefly, my main object is to provide an improved means of attaching and supporting a buffer or bumper upon the suspension springs of an automobile, especially leaf springs which extend longitudinally of the vehicle and which have curved ends connected with or suspended from shackles, all as hereinafter described and more particularly pointed out and distinctly claimed. In the attached drawing, Fig. 1 is a plan view of the rear end of an automobile, showing a bar bumper attached to the springs according to my invention; Figs. 2 and 3 are rear and side views, respectively, of the same parts; Fig. 4 is a sectional detail on line 4—4 of Fig. 3; and Figs. 5 to 9, inclusive, are separate views of the invention applied to a different form of bumper, Fig. 5 being a plan view of one end of a bumper attached to a spring, and Fig. 6 a side view and section of the same parts on a larger scale. Fig. 7 is a horizontal section on line 7—7 of Fig. 6, and Fig. 8 an elevation and section on line 8—8 of Fig. 6. Fig. 9 is a perspective view of the anchor plate in its preferred form.

The invention exemplified in one of its forms in Figs. 1 to 4, consists of buffer or bumper made of two bars 2 and 3, respectively, the impact bar 2 being straight except where curved inwardly and rearwardly at its ends to provide spring arms 4—4, and the rear supporting bar 3 being arched and bolted to arms 4. One of these bars, bar 3 in this instance, is further provided with horizontal arms or extremities 5—5 projecting in opposite directions to permit attachment of this buffer or bumper to the curved ends 6 of the leaf-springs 7 of an automobile. Arms 5 are flat and straight and when attached to the curved springs have linear engagement with the outer curved surface of the ends 6, and attachment is effected by a curved anchor plate 8 seated within the inner curved or concaved end of the main leaf of each spring. Anchor plate 8 is secured to arm 5 by bolts and nuts 9—9, and the lower end of the plate is preferably curved to conform to the curvature of the spring and extends downward to the eye 11 at the end of the spring, against which eye it bears and rests. Thus, the weight of the bumper and all bumper shocks are transmitted directly to and through the curved plate to the end eye of the spring where connected by shackle 12 to the other supporting part 13, be it a spring or solid perch, and the flexible part of the spring is relieved of a large part of the load and is not required to withstand the shocks by itself, nor is the flexibility or working action of spring 7 disaffected. As a matter of fact, anchor plate 8 reinforces the leaf spring at its shackle end, and preferably the plate is made of relatively thin sheet-metal stock possessing spring or flexible properties.

Anchor plate 8 is also preferably formed with spaced side flanges 14, see Fig. 9 to seat and engage arm 5' of the bumper opposite each side edge of spring 7, see Fig. 7, thus in a sense confining the spring loosely or with free play between the arm and the plate and preventing excess tightening of the bolts and injury to the spring in making attachments. The tapered extension or toe 15 of plate 8 serves to anchor and hold the plate and bumper in the desired relation and elevation as predetermined, the bolts merely functioning to unite the parts together without undue or excess tightening of the bolts or too tight a clamping of the spring between the parts.

In Figs. 5 to 9, the bumper arm 5 is a separate spring part fixed adjustably upon the rear bar of a loop-shaped bumper 16, but the invention is not limited to a particular kind of arm or bumper, but is applicable to all kinds of bumpers comprising a supporting bar or supporting arms adapted to be attached transversely to the outer flat sides of suspension springs substantially as herein shown and described.

What I claim, is

1. A buffer or bumper having a supporting member adapted to be attached to the suspension springs of an automobile, and anchoring devices seated in rest position within the springs against the shackle portions thereof and connected to said supporting member.

2. A buffer or bumper, comprising a bar, and separate plates adapted to secure said bar to the curved shackle ends of a pair of vehicle suspension springs, said plates having bottom portions formed to fit within the concaved side of said curved ends and to abut the shackle eye and adapted to function as rests.

3. A automobile buffer or bumper, comprising a supporting member, an anchor plate having a curved supporting extension conforming to and adapted to seat within the concaved side of the curved end of a vehicle spring, and means adapted to unite said member and plate together with the spring there-between.

4. An automobile buffer or bumper, comprising a supporting member, an anchor plate having an extended portion adapted to seat within the concaved side of the scroll end in rest position against the eye of a vehicle suspension spring, means at each side edge of said spring adapted to space said plate apart from said member to freely confine and receive the scroll of the spring, and means adapted to detachably unite said parts together.

5. An automobile buffer or bumper, comprising a supporting member adapted to be fastened transversely to the curved ends of a pair of suspension springs having eyes for shackles, a flanged plate seated astride each spring in rest engagement with said eyes, and bolts and nuts securing said member rigidly to said flanged plates.

6. A vehicle suspension spring having a curved end and an eye for a shackle bolt, in combination with a bumper, and an attaching member for said bumper seated within the concaved side of said curved end in thrust position against said eye.

In testimony whereof I affix my signature in presence of two witnesses.

WILLIAM G. COX.

Witnesses:
 GEO. E. KRICKER,
 DOROTHY M. MOSER.